United States Patent [19]
Eitzenberger

[11] Patent Number: 6,164,827
[45] Date of Patent: Dec. 26, 2000

[54] AEROSTATIC AIRBEARING

[76] Inventor: Hans Eitzenberger, Feichtmayrstr. 21, 82405 Wessobrunn, Germany

[21] Appl. No.: 09/296,247

[22] Filed: Apr. 22, 1999

[30] Foreign Application Priority Data

Apr. 29, 1998 [DE] Germany .......................... 198 19 226

[51] Int. Cl.[7] .................................................... F16C 32/06
[52] U.S. Cl. .............................. 384/12; 384/100; 384/291
[58] Field of Search .............................. 384/12, 100, 286, 384/291, 399

[56] References Cited

U.S. PATENT DOCUMENTS

| | | | |
|---|---|---|---|
| 3,318,557 | 5/1967 | Zhed et al. | 248/631 |
| 4,717,263 | 1/1988 | Phillips | 384/12 |
| 4,802,774 | 2/1989 | Pesikov | 384/100 X |
| 4,887,914 | 12/1989 | Lin et al. | 384/12 |
| 5,098,204 | 3/1992 | Blanz | 384/12 |
| 5,407,280 | 4/1995 | Heinzl et al. | 384/12 |

OTHER PUBLICATIONS

Dipl.–Ing. H. Donat et al., ". . . schwingungsfreier ebener rechteckiger Luftlager", Feingeratetechnik 31. Jg., Oct. 1982 (pp. 452–457).
Von H. Mussgnug "Mit Luft geschmierte Schlittenführung", wt–Z. ind. Fertig. 60 (1970) Nr. 10, (pp. 591–597).

Primary Examiner—Thomas R. Hannon
Attorney, Agent, or Firm—Smith Gambrell & Russell, LLP

[57] ABSTRACT

Aerostatic airbearing, comprising a counter body (2) having a counter surface (21) and a bearing body (1), having a bearing surface (11) arranged opposing the counter surface (21). In the bearing body (1) are formed a nozzle channel (12) ending at the bearing surface (11) and being connected to a pressure source supplying a feed pressure, and a micro channel structure (13) which extends along the bearing surface (11), is open towards the bearing surface (11) and runs into the nozzle channel (12). The airbearing has a static characteristic curve of the carrying force as a function of the gap width between the bearing surface (11) and the counter surface (21), which curve is defined by the structures of the bearing body (1) and of the counter body (2) and by the feed pressure. The micro channel structure (13) extends, in at least one direction of the bearing surface (11), over the most part of the bearing surface (11). The cross sections of the micro channel structure (13) are such small, that, at operating states of the characteristic curve, at which the carrying force is less than 50% of the maximum carrying capacity, the overall volume of channels of the micro channel structure (13) is less then 10%, preferably less than 7.5%, further preferably less than 6% of the volume between the bearing surface (11) and the counter surface (21).

19 Claims, 6 Drawing Sheets

AEROSTATIC AIRBEARING

The invention relates to an airbearing in which a bearing surface and a counter surface are separated by a cushion formed by a layer of gas, preferably by a layer of air, even when the bearing surface and the counter surface are not moving in relation to each other (aerostatic airbearing).

Simple nozzle airbearings are known comprising a bearing body having a bearing surface and a nozzle ending in the center of the bearing surface wherein gas is supplied through the nozzle to establish a pressurized gas cushion between the bearing surface and the counter surface. The pressure along the bearing surface gradually drops according to a parabolic function with increasing distance from the nozzle and, thus only takes very small values in the regions close to the edges of the bearing. Therefore, the pressure integral over the surface has a small value. Thus, the bearing has a small carrying (load) capacity. Increasing the load exerted to the airbearing and thus decreasing the gap width of the airbearing gap, i.e. the gap between the bearing surface and the counter surface, results in a proportional increase of the pressure over the whole bearing surface. Since the initial pressure in the regions close to the edge is small this proportional increase of the pressure does not provide for a large counterforce to compensate the load. Consequently the gap width is reduced significantly. The airbearing shows a low stiffness.

Different attempts were made in order to increase the carrying capacity and the stiffness. For example, it was suggested to provide the bearing surface forming bearing body with a recess in that region of the bearing surface where the nozzle opening is disposed. This recess was e.g. formed in the shape of a preceding cylindrical chamber having the same axis as the nozzle. From DD 221 514 A1 it is known to provide recesses in the shape of so-called micro channels which extend from the nozzle opening along the bearing surface and are connected to wider chambers arranged in the comers of the bearing surface, these chambers having a circular basis. In the DE 30 01 061 C2 a cylindrical airbearing is disclosed in which the bearing body is provided along the bearing surface with annular grooves extending in the circumferential direction and having a width of 1 mm and a depth corresponding to several times the gap width, wherein a plurality of nozzles formed in the bearing body runs into each of the grooves. The supposed gap width is 2 to 15 micrometers. From DE 39 33 698 C2 an airbearing is known having a system of distribution channels comprising channels radially extending from a pocket-like shaped recess disposed at the nozzle opening and a circumferential channel encircling the pocket-like shape d recess and connecting the radially extending channels. Further channel arrangements are known from the U.S. Pat. No. 3,318,557.

"Näherungsverfahren zur Dimensionierung schwingungsfreier ebener rechteckiger Luftlager of H. Donat, Feingerätetechnik 31 (1982), Heft 10, S. 457 demands that, for a system of distribution channels, the overall cross sectional area of the distribution channels is at least twice as large as the cross sectional area of a throttle in the gas supply duct of the nozzle. Mussgnug, H., „Mit Luft geschmierte Schlittenführung", wt-Z. ind Fertig., (60) 1970 Nr. 10, S. 591–597 demands that the overall cross sectional are a of distribution channels extending from the throttle and of a circumferential channel is at least 1.25 to 1.5 times the cross sectional area of the throttle.

Such preceding chambers and channel structures, also called pockets, serve to feed the pressure prevailing at the nozzle opening to large, and preferably peripheral, regions of the bearing surface. Thus, large regions are created at which the peak pressure prevails and from which the pressure drops according to a parabolic function. Thus, the average pressure prevailing over the bearing surface and the integral of the pressure over the bearing surface is increased. Thus load capacity and stiffness are increased. However, for the same gap width, that volume between the bearing surface and the counter surface which remains even with the maximum load, the so-called dead space, is enlarged due to the pockets. Consequently, the damping capabilities of the airbearing get worse. This results in a bad dynamic behaviour of the airbearing. In certain load ranges an instability occurs, i.e. an unstable oscillation resulting in a bottoming of the bearing surface on the counter surface.

In order to provide, at the same time, a large load capacity and stiffness on the one hand and a sufficient damping capability and stability on the other hand, DE 44 03 340 A1 desist s from providing pockets and suggests to provide the bearing body with a large number of micro nozzles distributed over the bearing surface, wherein the micro nozzles are manufactured by means of a laser beam. EP 0 708 262 A1 proposes to provide micro nozzles having a diameter less than 100, preferably less than 50 micrometers. In such micro nozzle bearings a high pressure can be established over large regions of the bearing surface without producing additional dead space. Thus a large load capacity and an improved stability compared to pocket bearings are combined. However, it is a drawback that the laser manufacturing of the micro nozzles requires much time and an expensive equipment. Moreover, there is a high risk of clogging of the nozzles. The micro nozzles act similar to an air filter. Small particles present in the supplied air are catched and the nozzles are clogged.

It is the object of the invention to provide an aerostatic airbearing combining a large load capacity and a large stiffness with good damping capabilities and a good stability behaviour, and requiring low costs and efforts for manufacturing.

According to the invention the object is achieved with an aerostatic airbearing having a structure of micro channels extending along the bearing surface, wherein structure of micro channels means a structure of channels having a significantly smaller cross section than channels of prior art airbearings of a corresponding type and size and operating at a corresponding feed pressure.

An aerostatic airbearing is provided, comprising a counter body having a counter surface; a bearing body, having a bearing surface arranged opposing the counter surface, a nozzle channel formed therein ending at the bearing surface and being connected to a pressure source supplying a feed pressure, and a micro channel structure formed therein, which is open towards the bearing surface, runs into the nozzle channel and extends along the bearing surface and, in at least one direction of the bearing surface, over the most part of the extent of the bearing surface; and a static characteristic curve of the carrying force as a function of the gap width between the bearing surface and the counter surface, which curve is defined by the structures of the bearing body and of the counter body and by the feed pressure; wherein the cross sections of the micro channel structure are such small, that, at operating states of the characteristic curve, at which the carrying force is less than 50% of the maximum carrying capacity, the overall volume of channels of the micro channel structure is less than 10% of the volume between the bearing surface and the counter surface.

Structure of the bearing body and the counter body, respectively, means the structure including the nozzle channel and the micro channel structure.

Providing a channel structure has the effect that the pressure prevailing at the nozzle opening is fed to larger, also remote, regions of the bearing surface such that large regions are created at which the peak pressure prevails and from which the pressure drops according to a parabolic function, so that the average pressure prevailing over the bearing surface and the integral of the pressure over the bearing surface are increased and thus load capacity and stiffness are increased.

By providing a micro channel structure which extends, in at least one direction of the bearing surface, over the most part of the extent of the bearing surface, the pressure increase is effected over large regions of the bearing surface and, thus the increase of the carrying force is effected to a large extent, and is equally distributed over the bearing surface.

A micro channel structure, i.e. a structure having channels of a small cross sectional area, has a similar pressure distributing effect as a structure of larger channels has. It is true that the area, where the comparatively high channel pressure prevails, is smaller than with larger channels, but it is decisive that the channel length is the same as in a larger channel structure, and thus the length, along which a pressure similar to that at the nozzle opening prevails and from which the pressure drops according to a parabolic function, is the same.

However, due to the small cross sectional area and thus the small volume of the micro channel structure, only a small amount of dead space deteriorating the stability behaviour is added. Therefore, the stability problems, which occur in bearings having pockets or larger channels, do not occur with the micro channels.

Due to the small cross sections of the micro channels the micro channel structure has a high flow resistance. When only a low load is exerted to the airbearing and, thus, the flow resistance in the bearing gap is low, nearly no flow through the micro channels occurs and, consequently, no pressure increase is effected in the micro channel structure. To provide for the required carrying force the airbearing adjusts to a lower gap width resulting in a higher pressure at the nozzle opening. The reduction of the gap width results in a smaller air cushion between the bearing surface and the counter surface and, thus, in a further improvement of the stability of the airbearing.

Only at operating states corresponding to elevated loads and, thus, smaller gap widths the micro channel structure causes similar effects as pockets do. At elevated loads the width of the bearing gap is decreased, that is the flow resistance in the gap is increased. Therefore, at this operating state, the air also flows through the micro channels. A significant pressure increase in the micro channel structure is effected, which improves the load capacity and the stiffness of the airbearing.

Thus, by dimensioning the channels as micro channels it is achieved that the carrying force increasing effects of the channels are only obtained at that range of loads where they are useful, namely at the range of high carrying loads. At the range of smaller loads the small volume of the micro channel structure provides for an improved stability behaviour. At this range the smaller size of the channels results in a slightly smaller area where the elevated pressure similar to that at the nozzle opening prevails. Therefore, to provide the same carrying force as a bearing with large channels the micro channel bearing adjusts to a smaller gap width resulting in a smaller air volume able to oscillate.

Providing micro channels instead of laser manufactured micro nozzles simplyfies the manufacturing of the bearing significantly.

The exact dimensions of the cross sections of the micro channel structure depend on the individual size and shape of the bearing and on the envisaged operating pressure fed to the bearing. The dimensions of the cross sections only have to be such small that, at those operating states of the characteristic curve corresponding to a carrying force of less than 50% of the maximum carrying capacity, the overall volume of the micro channel structure is less than 10% of the volume between the bearing surface and the counter surface. If the exact dimensions of the bearing to obtain an appropriate characteristic curve cannot be figured out by an arithmetic calculation or by simulations, they have to be gained by experiments. This can e.g. be realized by manufacturing a bearing and obtaining its characteristic curve by measuring at different operating states. If in the range of operating states corresponding to a carrying force of less than 50% of the maximum carrying capacity, an operating state occurs, at which the overall volume of the micro channel structure equals more than 10% of the volume between the bearing surface and the counter surface, the cross sectional areas of the micro channel structure have to be reduced. The bearing having reduced cross sections can then be measured again, and so on. In this way an appropriate characteristic curve can be obtained iteratively.

Preferably the cross sections of the micro channel structure are small, such that, at operating states of the characteristic curve, at which the carrying force is less than 50% of the maximum carrying capacity, the overall volume of channels of the micro channel structure is less than 7.5%, more preferably less than 6%, of the volume between the bearing surface and the counter surface.

In particular in smaller bearings, that is bearings having a maximum load capacity of less than 2000 N (or an area of the bearing surface of less than 100 cm$^2$) the dimensions of the cross sections of the micro channel structure are such small, that, at operating states of the characteristic curve, at which the carrying force is less than 50% of the maximum carrying capacity, the overall volume of channels of the micro channel structure is less than 7.5%, preferably less than 6%, more preferably less than 5%, e.g. 2%, of the volume between the bearing surface and the counter surface.

Preferably, the cross sections of the micro channel structure are small, such that, at operating states of the characteristic curve, at which the carrying force is less than 20% of the maximum carrying capacity, the overall volume of channels of the micro channel structure is less than 6%, preferably 1 to 5%, e.g. 3%, of the volume between the bearing surface and the counter surface.

It is possible that only one micro channel running into the nozzle channel and extending along the bearing surface is provided, or that a plurality of such channels is provided The bearing surface can e.g. have a plane, cylindrical or spherical shape or another shape appropriate for a desired movement between a bearing surface and a counter surface.

The micro channels according to the invention can e.g. have the shape of a section of a circle, a rectangle, a trapezoid. The cross section can remain the same over the whole length of the channel or can vary to a certain extent. Different micro channels can be provided having the same cross sections or having cross sections differing with respect to shape and/or size. The micro channels can e.g. be laser manufactured, milled, cut, grinded, etched or manufactured by applying material to the adjacent regions of the bearing surface.

The nozzle channel can have its smallest cross section, i.e. the characteristic cross section or throttle cross section, at its opening. It is also possible that the nozzle channel is widened at its opening to form a preceding chamber, into which the micro channels run. Such a preceding chamber fulfils the function of distributing the air flow coming from the pressure source to the different micro channels. The preceding chamber provides for an easier manufacturing. Manufacturing the micro channels such that they run into the nozzle channel requires a lower accuracy if the nozzle channel is widened to a preceding chamber.

The airbearing can be designed for an operation using air, inert gases or other gases. That is, concerning the operation fluid, the wording "aerostatic" is not meant in a limiting sense.

Preferably, the ratio of the sum of the cross sectional areas of the micro channels running into the nozzle channel to the area of the narrowest cross section of the nozzle channel is less than 1.85, more preferably less than 1.5, more preferably less than 1.2, e.g. 0.3 or 0.6 or 0.9. Thereby is ensured that the pressure conditions at the nozzle opening and the pressure drop along the micro channel structure are matched so that the micro channels come into effect only in the range of higher loads exerted to the airbearing. In the range of lower loads the above mentioned ratio of the cross sections results in a high flow resistance in the micro channels compared to the flow resistance in the bearing gap so that the bigger portion of the air (or an other fluid) is carried off the bearing through the bearing gap, but not through the channels. That is, the micro channels to not come into effect. This changes when the load increases and correspondingly the gap width decreases, e.g. gradually beginning at 30% of the maximum carrying capacity. In consequence, no deterioration of the stability is caused in the range of lower loads.

Preferably the sum of the cross sectional areas of the micro channels running into the nozzle channel is more than $2*10^{-8}$ m$^2$ and less than $1*10^{-7}$ m$^2$, e.g. about $5*10^{-8}$ m$^2$. Thereby is ensured that even with a very large cross section of the nozzle, no increase of the carrying force is caused by the micro channels in the range of lower loads.

Preferably the overall base area of the micro channel structure takes from 0.1% to 3.0%, preferably from 0.3% to 1.0%, of the area of the bearing surface. Typically, the overall base area of the micro channel structure takes about 1.0% for comparatively small bearings, that is bearings having a maximum carrying capacity of less than 2000 N (or a bearing surface of less than 100 cm$^2$), and takes about 0.3% for comparatively large bearings. Thereby is achieved, to avoid a significant mechanical weakening of the bearing body at the bearing surface, on the one hand, and to reduce, on the other hand, the time and the equipment required for the manufacturing of the micro channels.

Preferably, the micro channels of the micro channel structure have a width-to-depth ratio of less than 10:1, preferably less than 4:1, e.g. 3:1. Further preferably the ratio is at least 1:1. Thereby it is achieved that the typically occuring surface inaccuracies of the bearing surface do only result in relatively slight inaccuracies of the cross sections of the channels, and that is ensured that the micro channels come into effect only in the upper range of loads. Having a more flat cross section the micro channels act as a simple enlargement of the bearing gap and do not show the desired load dependence. Forming a channel structure more deep than wide results in an increased dead space deteriorating the stability without achieving a further essential reduction of the flow resistance in the micro channels.

Typically a channel cross section in the shape of a segment of a circle is formed having a radius of 0.1 mm and a depth of 0.06 mm corresponding to width-to-depth ratio of 3:1.

Preferably the micro channels of the micro channel structure each have a cross sectional area of less than $2*10^{-8}$ m$^2$, e.g. $0.2*10^{-8}$ m$^2$, $0.5*10^{-8}$ m$^2$, $1.1*10^{-8}$ m$^2$, $1.3*10^{-8}$ m$^2$, $1.5*10^{-8}$ m$^2$, $1.8*10^{-8}$ m$^2$, further preferably about $1*10^{-8}$ m$^2$. Thereby it is achieved that the micro channels show, due to wall friction, a sufficient flow resistance along the micro channels resulting in a sufficient pressure drop along the channels which ensures that a n elevated pressure level in the micro channels is only established at smaller gap widths, that is in the range of larger loads.

Channels of the micro channel structure can extend t o the edge of the bearing surface. Preferably, the micro channel structure only comprises channels extending at a distance from the outer edge of the bearing surface. Thus, it is avoided that a portion of the air flow is carried away from the airbearing without being used for establishing an elevated pressure level and increasing the carrying force.

It is e.g. possible that the micro channel structure exclusively comprises micro channels directly running into the nozzle channel. The micro channel structure can also comprise channels branching from micro channels directly running into the nozzle channel. This is advantageous, since an optimum overall length of the channel structure and an optimum distribution of the channels over the whole bearing surface can be obtained at the same time. Preferably, a channel structure is formed, having six channels running into the nozzle opening equally spaced by angles of 60° (star-shaped arrangement) or a channel structure is formed having four channels, which pairwise extend along the same straight line and run into the nozzle channel at positions opposite to each other, wherein the two straight lines, along which the channels extend, form an angle of less than 90° (St. Andrew's Cross arrangement). A channel structure in the shape of a St. Andrew's Cross is arranged at the bearing surface such that its longer dimension extends in a direction perpendicular to the direction of the desired relative movement between the bearing surface and the counter surface. Both, the star-shaped arrangement and the St. Andrew's Cross arrangement can be provided with branch channels, which extend e.g. in a direction towards the edges of the bearing surface (chrismas tree arrangement) or extend parallel to the edges of the bearing surface (emcompassing arrangement). Such branch channels have the advantage that pressure increasing and, thus, carrying force increasing micro channels are provided close to the edges, and thus at a position, where extremely high loads are exerted if momentum loads are carried by the airbearing.

Preferably, a channel arrangement is formed avoiding that a fluid mechanical short circuit through one of the micro channels occurs between two regions of the bearing surface, one of which being exposed to a high load and the other of which, at the same time, being exposed to a small load. By excluding the occurence of a short circuit, a decrease of the carrying force due to a pressure balancing flow within the micro channel structure is avoided.

Preferably, the aerostatic airbearing has a cylindrical bearing surface and comprises one or more micro channel substructures each being fed by a separate nozzle and extending only in the axial direction.

The airbearing according to the invention can comprise one or more further nozzle channels in addition to the nozzle channel mentioned above. Not each nozzle channel must necessarily have an own micro channel substructure.

Preferably, however, a separate micro channel substructure runs into each nozzle channel.

A one-nozzle-airbearing requires a smaller air throughput. Further, the single nozzle has quite a large cross section and does, therefore, not tend to be clogged. With the same overall length of the micro channel structure providing only one single nozzle results in a longer average distance of the channel sections to the nozzle. Consequently, the flow path of the air is long. That is, the propagation time, i.e. the time period, until the flow conditions along the whole flow path have adapted upon a variation of the bearing gap width due to a variation of the load, is long. In consequence, the conditions in the bearing gap change, for a long time period, according to a polytropic curve. Later, these changes are compensated dissipating fluid mechanical energy. This results in improved damping capabilities.

A multi-nozzle-airbearing allows an arrangement of the channel structure, which can be perfectly adapted to the loads exerted to the airbearing. Both, the positions of the channels, in particular channels provided close to the edges of the bearing surface in order to carry momentum loads, and the length of the channels can be adjusted independently from each other.

Moreover, a multi-nozzle-arrangement can be used to obtain an airbearing showing reduced vibrations. In the nozzle channel flow velocities about the sound velocity can be reached. Therefore, discontinuity waves can occur in the nozzle channel resulting in vibrations. Having one large nozzle channel, the air throughput is comparatively high resulting in big vibration amplitudes when discontinuites occur. In a multi-nozzle arrangement the air throughput in the single nozzle is smaller resulting in smaller vibration amplitudes, since normally, the discontinuities in the different nozzle channels do not exactly occur at the same instant.

The aerostatic airbearing according to the invention can have a pressure source adapted to provide an appropriate feed pressure. Preferably the aerostatic airbearing comprises a pressure source, from which a feed pressure (operation pressure) of more than 4 bar is feedable to the nozzle channel. It is even more preferred that the aerostatic airbearing comprises a pressure source, from which a feed pressure of more than 7 bar, more preferably more than 10 bar, can be fed to the nozzle channel. This elevated feed pressure provides for a very large carrying capacity. The instabilities normally occuring at these elevated pressure levels, in particular at pressure levels of more than 7 bar, are eliminated by the effects of the micro channel structure.

An aerostatic bearing is prestressed to a certain extent by the own weight forces of the bearing elements. In order to establish an air cushion separating the bearing surface and the counter surface from each other, first a threshold pressure has to be fed to the nozzle channel of the airbearing to overcome these own weight forces of the bearing. That is, when the full feed pressure is supplied, a portion of the maximum carrying capacity is used to compensate the prestressing. This portion can be intentionally increased e.g. by providing an additional prestress mass fixed to the bearing elements. Conventional bearings are often significantly prestressed in order to avoid that, at high pressures fed from the pressure source, instabilities occur. This has the drawback that an important portion of the large carrying capacity provided by feeding the high pressure is used for compensating the prestress of the bearing and, thus only a reduced carrying force can be used for carrying the external loads to be carried by the bearing.

Preferably the aerostatic airbearing according to the invention comprises a pressure source, by which a feed pressure of more than 7 bar, more preferably more than 10 bar, can be fed to the nozzle channel, and is prestressed by a prestress force corresponding to less than 50%, preferably less than 33%, more preferably less than 20%, of the maximum carrying capacity. Such a bearing provides a much wider range of carriable loads than known so far. On the one hand, an elevated pressure is fed so that an elevated maximum carrying capacity is obtained. On the other hand, only a small portion of the maximum carrying capacity is used to compensate for the forces due to the own weight of the bearing and the prestress, respectively. The problem of instabilities is eliminated by providing the micro channels resulting in an improved stability behaviour. Therefore, it is not required to eliminate the instabilities by providing significant prestressing.

In order that the invention may be readily carried out into effect, embodiments thereof will now be described by way of example with reference to the accompanying diagrammatic drawings, wherein:

FIG. 1 is a partially broken perspective view of a bearing body and a counter body of an embodiment of the aerostatic airbearing according to the invention;

FIGS. 2a to f are plan views of micro channel structures in the bearing bodies of airbearings according to different embodiments of the aerostatic airbearing according to the invention;

Figure 4:
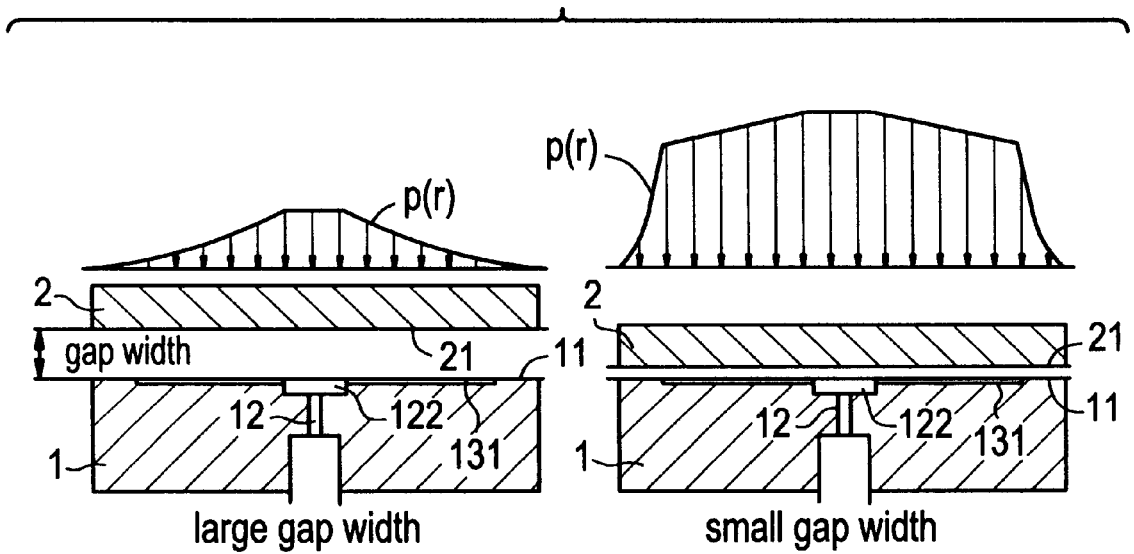
Figure 5A:
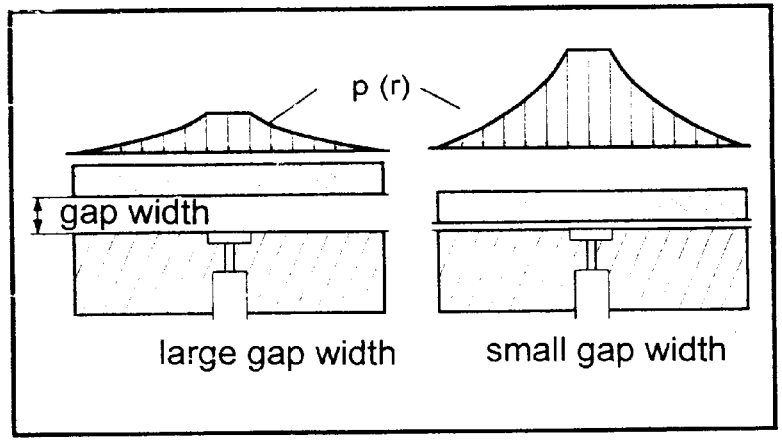
Figure 5B:
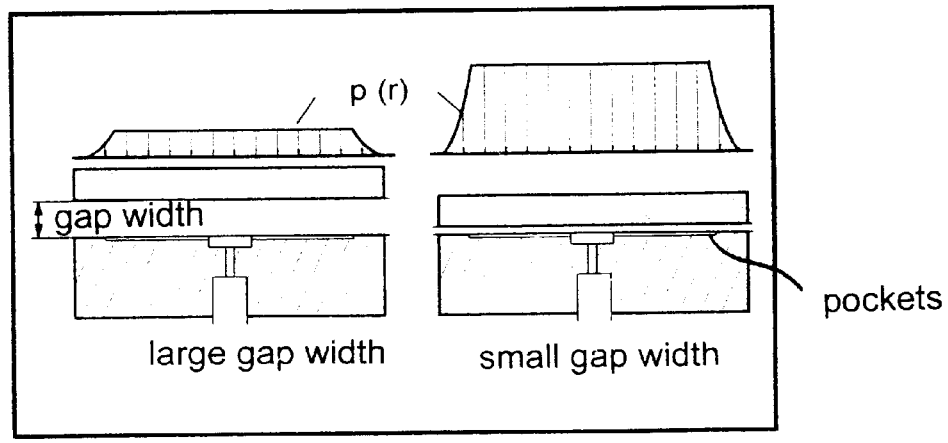
Figure 5C:
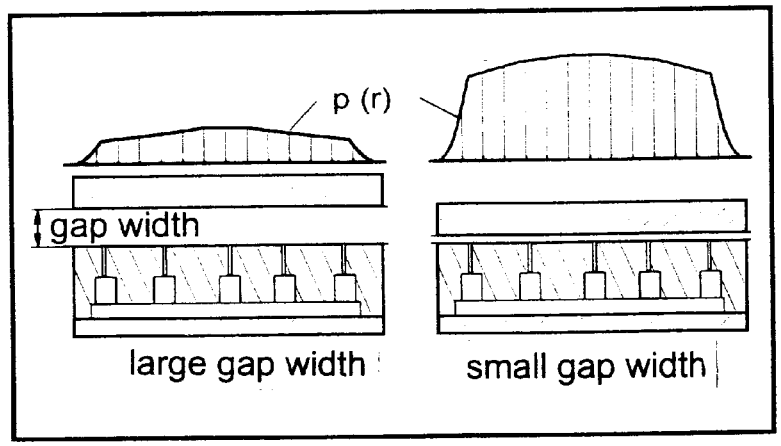
Figure 6:
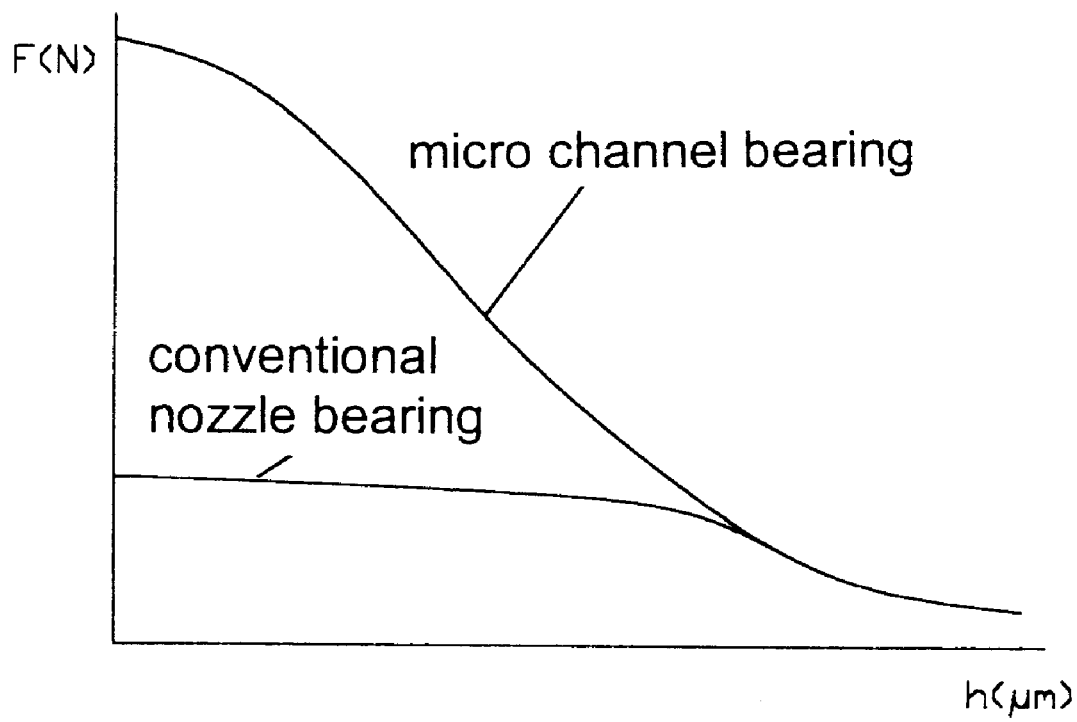

FIG. 4 a schematic view of an aerostatic airbearing according to the invention together with two graphs illustrating the pressure distribution along the bearing surface at a large gap width and at a small gap width, respectively, and thereby illustrating the effects of the invention;

FIGS. 5a to c schematic views of conventional aerostatic airbearings having a simple nozzle (FIG. 5a), having a pocket (FIG. 5b) and having micro nozzles (FIG. 5c), respectively, together with graphs illustrating the pressure distribution along the bearing surface at a large gap width and at a small gap width, respectively; and FIG. 6 a diagramm showing a comparison of the characteristic curves of a conventional nozzle bearing and an aerostatic airbearing according to the invention the curves each representing the carrying force as a function of the gap width of the bearing gap.

Figure 1:
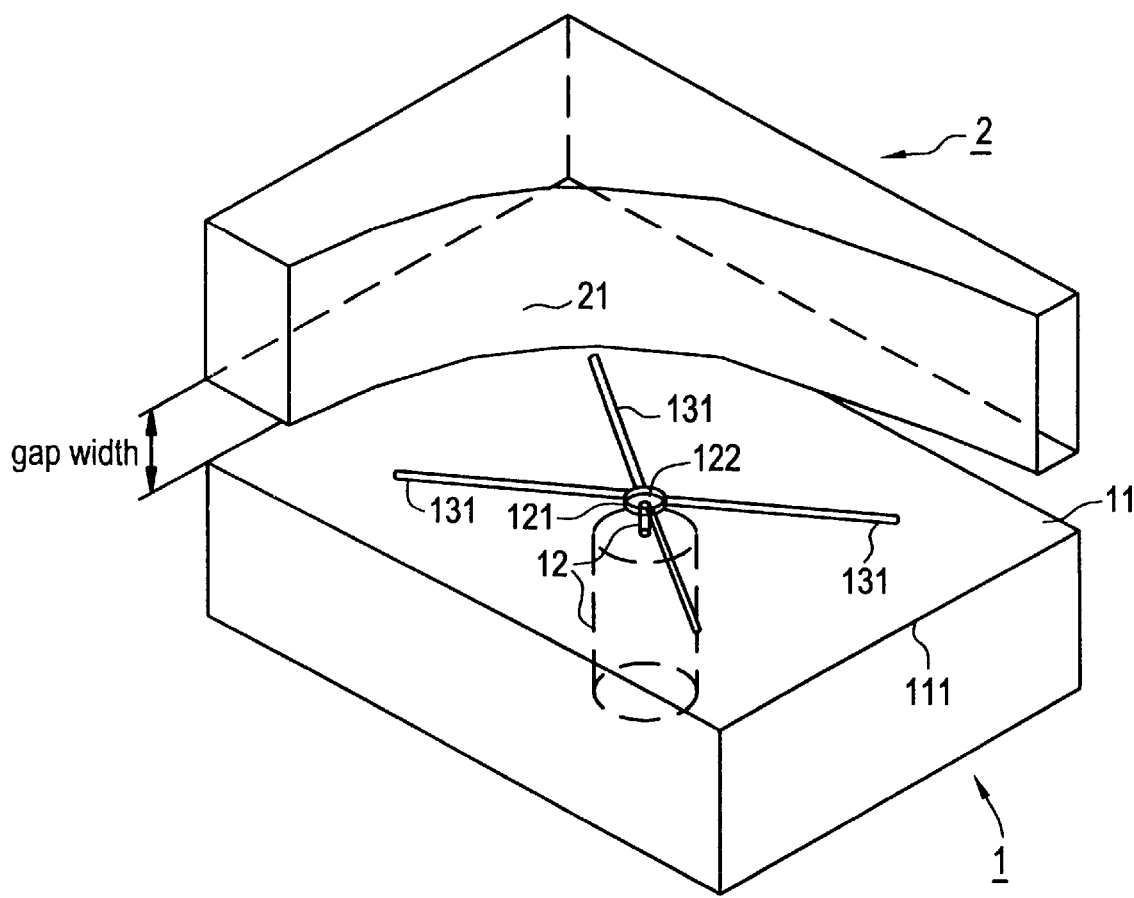

FIG. 1 is a partially broken perspective view of a bearing body and a counter body of an embodiment of the aerostatic airbearing according to the invention. A counter body comprises, at its side which is the bottom side in the figure, a plane counter surface 21. A plane bearing surface 11 of a bearing body 1 is disposed opposing the counter surface 21. In the bearing body 1 a nozzle channel 12 is formed passing through the bearing body 1 and ending with its opening in the center of the bearing surface 11. The nozzle channel 12 is connected to a pressure source (not shown). The nozzle channel 12 is formed cylindrically and has at its opening an enlarged cylindrical section forming a preceding chamber 122. In the section of the preceding chamber 122 four micro channels 131 of a micro channel structure 13 run into the lateral wall 121 of the nozzle channel 12. Each of the micro channels 131 is open towards the bearing surface 11 and extends from the nozzle channel 12 straight along the bearing surface 11 in a direction to the outer edge 111 of the bearing surface 11 and ends at a distance from the outer edge 111. Pairwise the micro channels 131 extend along the same straight line and run into the nozzle channel 12 at positions opposite to each other. The two straight lines, along which the micro channels 131 extend, form an angle of less than 90°, such that a micro channel structure 13 in the shape of a St. Andrew's Cross is formed. Each of the micro channels 131 has a cross sectional area of $6.0*10^{-9}$ m$^2$. In the section upstream of the preceding chamber 122 the nozzle channel 12 has a crosssectional area of $3.0*10^{-8}$ m$^2$. Thus, the sum of the cross sectional areas of all the four micro channels 131 running into the nozzle channel 12 has an over-all cross sectional area corresponding to 0.8 times the smallest cross sectional area of the nozzle channel 12. A preferred embodiment of the aerostatic airbearing according to the invention shows the following design features:

| Shape of the Bearing surface | rectangular (according to FIG. 1) |
| --- | --- |
| Area of the bearing surface | $1.2 * 10^{-3}$ m$^2$ |
| Nozzle cross section | $3.0 * 10^{-8}$ m$^2$ |
| Shape of micro channel structure | St. Andrew's Cross |
| Number of micro channels | 4 |
| Cross section per channel | $6.0 * 10^{-9}$ m$^2$ |
| Feed pressure/operating pressure | 6 bar ($6.0 * 10^5$ Pa) |
| Maximum carrying capacity | 500 N |
| Maximum stiffness | 80 N/micrometer |

Figure 2A:
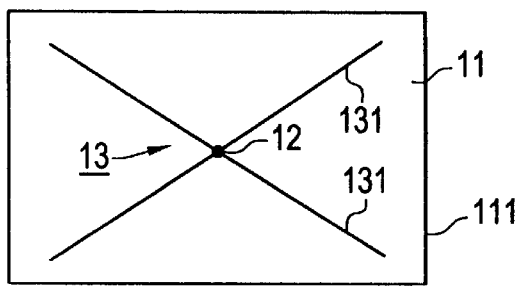
FIGS. 2g illustrates the cross sectional shape of micro channels in the bearing bodies of air bearings according to various embodiments of the aerostatic air bearing according to the invention.

FIGS. 2a to f show plan views of different micro channel structures 13. FIG. 2a shows a plan view of the micro channel structure 13 of FIG. 1.

Figure 2C:
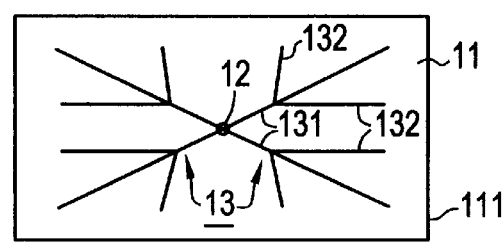
Figure 2B:
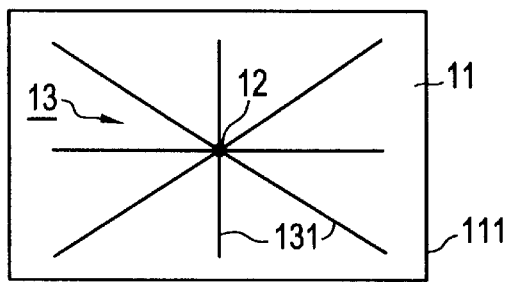

FIG. 2b shows an arrangement of micro channels 131 star-shaped in the plan view. The arrangement includes a channel structure corresponding to the micro channel structure of FIG. 2a and four additional straight micro channels 131 each running into the nozzle channel 12 and extending between two adjacent ones of the micro channels 131 of FIG. 2a.

Figure 2D:
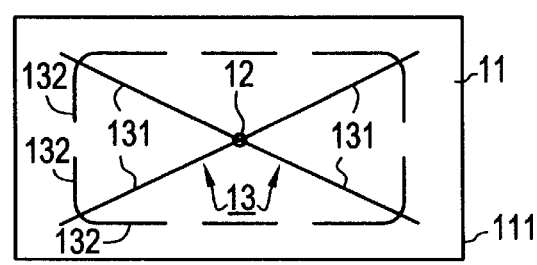

FIG. 2c and FIG. 2d each show a micro channel structure 13 having four micro channels 13 extending from the nozzle channel 12 in the shape of a St. Andrew's Cross as the micro channel structure 13 according to FIG. 2a. The micro channel structure 13 shown in FIG. 2c has the shape of a chrismas tree. Two branch channels 132 branch off from each of the micro channels 131 and extend in a direction towards the edges of the bearing surface.

The micro channel structure 13 shown in FIG. 2d comprises a broken encompassing channel. Two branch channels 132 branch off from each of the micro channels 131 and extend in a direction parallel to the edges of the bearing surface.

Figure 2E:
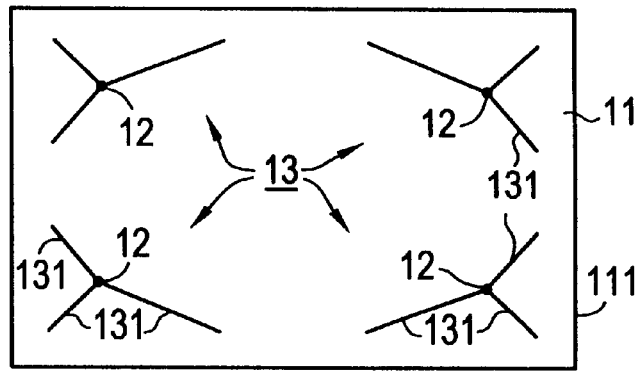
Figure 2F:
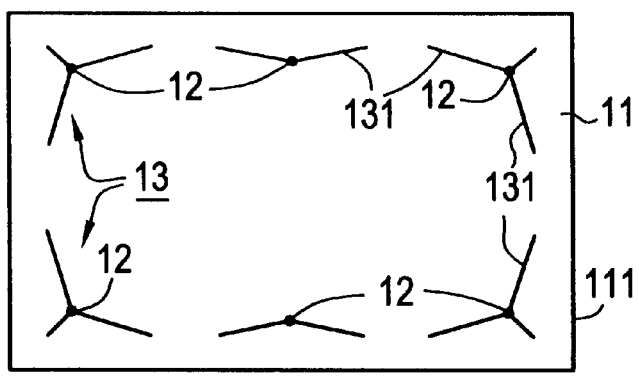

The micro channel structures 13 according to FIGS. 2a to 2d each correspond to a one-nozzle-airbearing. FIGS. 2e and 2f each show a multi-nozzle-airbearing. In the micro nozzle structure 13 shown in FIG. 2e four nozzle channels 12 end with their nozzle openings at a rectangular bearing surface 11, wherein each of the nozzle channels 12 ends in the region of a respective one of the comers of the bearing surface 11. Three micro channels 131 run into each of the nozzle channels 12, one extending in the direction towards the respective corner of the bearing surface 11, one extending in the direction towards the center of the first edge of the bearing surface 11 ending at the respective corner 11 and one extending in the direction towards the center of the second edge of the bearing surface 11 ending at the respective corner. However, each of the three micro channels 131 ends at a significant distance from the edge of the bearing surface 11.

The micro channel structure 13 shown in FIG. 2f is essentially shaped as the micro channel structure 13 according to FIG. 2e with the difference, that two additional nozzle channels 12 are provided at the bearing surface 11, each ending with its nozzle opening at a position at the center of a respective one of the longer sides of the rectangular bearing surface 11 at a distance from the edge of the bearing surface 11. Two micro channels 131 run into each of these nozzle channels 12, each of these micro channels 131 extending in the direction towards a respective one of those corners of the bearing surface 11, between which the respective longer side of the rectangle extends.

Figure 2G:
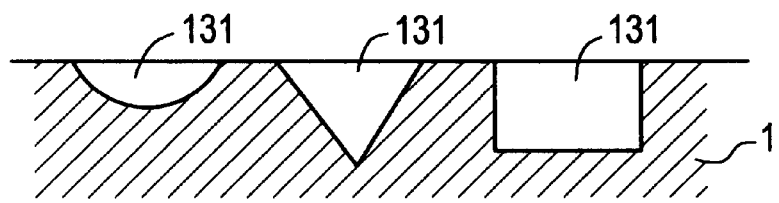

FIGS. 2g shows cross sectional views of micro channels 131 formed in the bearing body 1 of aerostatic airbearings according to different embodiments of the invention. FIG. 2g shows a cross section in the shape of a segment of a circle, FIG. 2h shows a cross section in the shape of a triangular and FIG. 2g shows a cross section in the shape of a rectangular.

Figure 3:
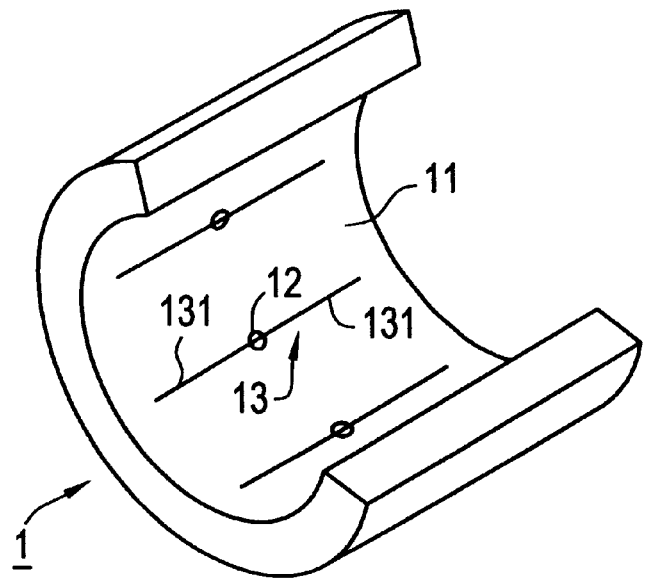
FIG. 3 is a partially broken perspective view of a bearing body with a cylindrical bearing surface, nozzles and a micro channel structure according to an embodiment of the aerostatic airbearing according to the invention.

FIG. 3 shows a bearing body 1 having a cylindrical bearing surface 11. The bearing body 1 is provided with nozzle channels 12 the nozzle openings of which ending at positions equally spaced along the circumference, wherein from each nozzle channel 12 two micro channels 131 extend in directions opposite to each other and parallel to the axial direction of the cylindrical bearing surface 11.

FIG. 4 is a schematic view of an aerostatic airbearing according to the invention together with the pressure distribution along the bearing surface in two operating states, at a large gap width and at a small gap width, respectively. The pressure distributions in the different operating states illustrate the effects of the invention. The left part of FIG. 4 showing the operating state at a large gap width corresponds to a point on the characteristic curve of the aerostatic airbearing where the carrying force is less than one third of the maximum carrying capacity. The pressure distribution does not show much difference from the pressure distribution in a conventional airbearing. The pressure along the bearing surface 11 drops according to a parabolic function with increasing distance from the opening of the nozzle channel 12 or the preceding chamber 122, respectively. The micro channels 131 do not provide for a pressure increase in the peripheral regions of the bearing surface. The actual carrying load of the aerostatic airbearing according to the invention at this operating state equals about 20% of the maximum carrying capacity, i.e. much more than 50%. The overall volume of the channels of the micro channel structure at this operating state equals far less than $\frac{1}{10}$, e.g. $\frac{1}{30}$, of the volume between the bearing surface 11 and the counter surface 12, that is the product of the gap width and the area of the smaller one of the bearing surface 11 and the counter surface 12. Consequently the overall volume and such the flow resistance of the micro channel structure 13 does not matter a lot at this operating state and, above all, does not worsen the stability behaviour of the airbearing.

The right part of FIG. 4 showing the operating state at a small gap width corresponds to a point on the characteristic curve of the aerostatic airbearing where the carrying force is more than one third of the maximum carrying capacity, e.g. 60%. The pressure distribution shows a significant difference with respect to the pressure distribution in a conventional airbearing. In the regions of the bearing surface, where the micro channels 131 extend, the pressure increases superproportionally compared to those regions close to the nozzle opening and to those regions remote of the micro channels 131, as can be seen by comparing the pressure distributions in the right and in the left part of the FIG. 4.

Thereby, a significant improvement of the carrying capacity and of the stiffness of the airbearing is obtained, for those parts of the characteristic curve corresponding to higher loads. At these operating states the ratio of the overall volume of the micro channel structure 13 and the volume between the bearing surface 11 and the counter surface 12 is larger and such the air flow through the micro channel structure 13 plays an important part.

FIGS. 5*a* to *c* are schematic views of conventional aerostatic airbearings having a simple nozzle (FIG. 5*a*), having a pocket (FIG. 5*b*) and having micro nozzles (FIG. 5*c*), respectively, together with graphs illustrating the pressure distribution along the bearing surface at a large gap width and at a small gap width, respectively. Comparing these curves with the curves of FIG. 4 serves to illustrate which differing effects are obtained by an airbearing according to the invention compared to the different types of conventional airbearings.

Comparing the left pressure distributions of FIG. 4 and of FIG. 5*a* makes obvious that, at operating states with a large gap width, the pressure distribution does not show significant differences with respect to that of a conventional nozzle airbearing. I.e., the advantage of a nozzle airbearing without pockets, namely a good stability behaviour, is maintained in the airbearings according to the invention. Comparing the right pressure distributions of FIG. 4 and of FIG. 5*a* makes obvious that, at operating states with a small gap width, in airbearings according to the invention, the area below the curve of the pressure distribution over the bearing surface increases stronger than in conventional bearings due to the superproportional pressure increase in the regions of the micro channels 131, and such the carrying capacity and the stiffness are improved.

Comparing the right pressure distributions of FIG. 4 and of FIG. 5*b* makes obvious that the superproportional increase of the pressure in the region of the micro channels 131 resulting in the stronger increase of the area below the curve of the pressure distribution, at operating states with a small gap width, provides that, in an airbearing according to the invention, a similar or the same carrying capacity and stiffness are obtained as in airbearings having pockets as shown in FIG. 5*b*. However, compared to the airbearings having pockets shown in FIG. 5*b*, the airbearings according to the invention show a far better stability behaviour at those operating states with a large gap width.

Comparing the right pressure distributions of FIG. 4 and of FIG. 5*c* makes obvious that the superproportional increase of the pressure in the region of the micro channels 131 resulting in the stronger increase of the area below the curve of the pressure distribution, at operating states with a small gap width, provides that, the airbearings according to the invention even show a similar or the same carrying capacity and stiffness as airbearings having micro nozzles. At the same time, due to the comparatively small volume of the micro channel structure 13, the stability behaviour, at operating states with a large gap width, is at least as good as with the micro nozzle airbearings shown in FIG. 5*c*.

Comparing the left pressure distributions of FIG. 4 and of FIG. 5*c* makes obvious that, for airbearings according to the invention the area below the curve of the pressure distribution over the bearing surface is smaller than for airbearings having micro nozzles, at operating states with the same gap width. Consequently, airbearings according to the invention adapt to a small gap width already at lower loads. That is, already at lower loads the air cushion able to generate oscillations is reduced, so that already at lower loads a good stability is obtained. Such, at operating states corresponding to lower loads, the stability behaviour of airbearings according to the invention is even better than that of airbearings having micro nozzles.

FIG. 6 shows a comparison of the characteristic curves of the carrying force/carried load as a function of the gap width of the bearing gap for the a conventional nozzle bearing and for a micro channel bearing according to the invention. Both airbearings are one-nozzle-bearings. The micro channel structure only starts to have an effect with loads corresponding to one third of the maximum carrying capacity of the micro channel bearing. Therefore, with lower loads less than one fourth of the maximum carrying capacity, the characteristic curve of the conventional nozzle bearing without micro channels shows the same shape as the characteristic curve of the micro channel bearing. At one fourth of the maximum carrying capacity of the micro channel bearing (corresponding to a gap width of about 10 to 25 micrometers) the characteristic curve of the conventional nozzle bearing has a turning point. From here towards smaller gap widths the characteristic curve becomes less steep and extends nearly horizontally over quite a long range of gap widths down to the gap width h=0. Here, the characteristic curve of the micro channel bearing has its maximum carrying capacity corresponding to about one third of the maximum carrying capacity of the micro channel bearing. As shown in FIG. 6, the characteristic curve of the micro channel bearing extends steep, even at smaller gap widths than that corresponding to the turning point of the conventional nozzle bearing. In this gap width range the effects of the micro channels play an important part. At lower gap widths the carrying force continues to increase significantly. The turning point of the characteristic curve of the micro channel bearing only is reached at a gap width of 4 to 8 micrometers. The carrying capacity takes about three times the carrying capacity of the conventional airbearing.

Other modifications and adaptations of the invention, which are obvious to the person skilled in the art, are intended to be comprehended within the meaning of the appended claims. Hence, the invention is not to be construed as limited to the specific embodiments described above.

What is claimed is:

1. Aerostatic airbearing, comprising
   a) a counter body (2) having a counter surface (21),
   b) a bearing body (1), having
      a bearing surface (11) arranged opposing the counter surface (21),
      a nozzle channel (12) formed therein ending at the bearing surface (11) and being connected to a pressure source supplying a feed pressure, and
      a micro channel structure (13) formed therein which extends along the bearing surface (11) being open towards the bearing surface (11), runs into the nozzle channel (12) and extends along the bearing surface (11), in at least one direction of the bearing surface (11), over the most part of the extent of the bearing surface (11), and
   c) a static characteristic curve of the carrying force as a function of the gap width between the bearing surface (11) and the counter surface (21), which curve is defined by the structures of the bearing body (1) and of the counter body (2) and by the feed pressure, wherein
   d) the cross sections of the micro channel structure (13) are such small, that, at operating states of the characteristic curve, at which the carrying force is less than 50% of the maximum carrying capacity, the overall volume of channels of the micro channel structure (13) is less then 10%, of the volume between the bearing surface (11) and the counter surface (21).

2. Aerostatic airbearing according to claim 1, wherein the overall volume of channels of the micro channel structure is less than 7.5% of the volume between the bearing surface and the counter surface.

3. Aerostatic airbearing according to claim 1, wherein the overall volume of channels of the micro channel structure is less than 6% of the volume between the bearing surface and the counter surface.

4. Aerostatic airbearing according to claim 1, wherein the ratio of the sum of the cross sectional areas of the micro channels (131) of the micro channel structure (13), which run into the nozzle channel (12), to the area of the narrowest cross section of the nozzle channel (12) is less than 1.85.

5. Aerostatic airbearing according to claim 1, wherein the ratio of the sum of the cross sectional areas of the micro channels of the micro channel structure, which run into the nozzle channel, to the area of the narrowest cross section of the nozzle channel is less than 1.5.

6. Aerostatic airbearing according to claim 1, wherein the ratio of the sum of the cross sectional areas of the micro channels of the micro channel structure, which run into the nozzle channel, to the area of the narrowest cross section of the nozzle channel is less than 1.2.

7. Aerostatic airbearing according to claim 1, wherein the sum of the cross sectional areas of the micro channels (131) running into the nozzle channel (12) is more than $2*10^{-8}$ m$^2$ and less than $1*10^{-7}$ m$^2$.

8. Aerostatic airbearing according to claim 1, wherein the overall base area of the micro channel structure (13) takes from 0.1% to 3.0%, of the area of the bearing surface (11).

9. Aerostatic airbearing according to claim 1, wherein the overall base area of the micro channel structure (13) takes from 0.3% to 1.0% of the area of the bearing surface (11).

10. Aerostatic airbearing according to one of claim 1, wherein the micro channels (131) of the micro channel structure (13) have a width-to-depth ratio of less than 10:1.

11. Aerostatic airbearing according to claim 1, wherein the micro channels (131) of the micro channel structure (13) have a width-to-depth ratio of less than 4:1.

12. Aerostatic airbearing according to one of claim 1, wherein the micro channels (131) of the micro channel structure (13) have a cross sectional area of less than $2*10^{-8}$ m$^2$.

13. Aerostatic airbearing according to claim 1, wherein the micro channels (131) of the micro channel structure (13) have a cross sectional area of less than $1*10^{-8}$ m$^2$.

14. Aerostatic airbearing according to one of claim 1, wherein the micro channels (13) of the micro channel structure extend keeping a distance from the outer edge (111) of the bearing surface (11).

15. Aerostatic airbearing according to one of claim 1, comprising a pressure source, from which a feed pressure of more than 4 bar, can be fed to the nozzle channel (12).

16. Aerostatic airbearing according to claim 1, comprising a pressure source, from which a feed pressure of more than 7 bar can be fed to the nozzle channel (12).

17. Aerostatic airbearing according to claim 1, comprising a pressure source, from which a feed pressure of more than 10 bar can be fed to the nozzle channel (12).

18. Aerostatic airbearing according to one of claim 1, being prestressed by a prestress force corresponding to less than 50%, of the maximum carrying capacity.

19. Aerostatic airbearing according to claim 1, being prestressed by a prestress force corresponding to less than 33% of the maximum carrying capacity.

* * * * *